(12) United States Patent
Hotchkiss et al.

(10) Patent No.: US 12,513,592 B2
(45) Date of Patent: Dec. 30, 2025

(54) Wi-Fi NETWORK SUPPORTING MULTIPLE VIRTUAL NETWORKS

(71) Applicant: Plume Design, Inc., Palo Alto, CA (US)

(72) Inventors: Adam R. Hotchkiss, Richardson, TX (US); Bin Hu, Los Altos, CA (US); Matej Zevnik, Ljubljana (SI); Robert Miller, Menlo Park, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 405 days.

(21) Appl. No.: 17/903,132

(22) Filed: Sep. 6, 2022

(65) Prior Publication Data

US 2024/0080744 A1 Mar. 7, 2024

(51) Int. Cl.
*H04W 4/00* (2018.01)
*H04L 12/46* (2006.01)
*H04L 41/22* (2022.01)
*H04W 40/02* (2009.01)
*H04W 40/24* (2009.01)
*H04W 84/12* (2009.01)

(52) U.S. Cl.
CPC ......... *H04W 40/02* (2013.01); *H04L 12/4641* (2013.01); *H04L 41/22* (2013.01); *H04W 40/248* (2013.01); *H04W 84/12* (2013.01)

(58) Field of Classification Search
CPC ... H04W 88/06; H04W 40/02; H04W 40/248; H04W 84/12; H04L 12/4641; H04L 41/122; H04L 41/0895; H04L 41/40; H04L 41/22; H04L 41/5041; H04L 43/0811; H04L 43/0876; H04L 43/0817
See application file for complete search history.

(56) References Cited

U.S. PATENT DOCUMENTS

| 11,368,903 | B2 | 6/2022 | Agarwal et al. |
|---|---|---|---|
| 2011/0247052 | A1 | 10/2011 | Kim et al. |
| 2015/0188949 | A1 | 7/2015 | Mahaffey et al. |
| 2016/0212695 | A1 | 7/2016 | Lynch et al. |
| 2016/0337206 | A1* | 11/2016 | Bugenhagen ........... H04L 67/02 |
| 2016/0366620 | A1* | 12/2016 | Royon ............. H04W 36/0055 |
| 2017/0223756 | A1* | 8/2017 | Sebastian ............ H04L 12/4633 |
| 2017/0272317 | A1 | 9/2017 | Singla et al. |
| 2017/0272507 | A1 | 9/2017 | Hotchkiss et al. |
| 2017/0272965 | A1 | 9/2017 | Kumar et al. |
| 2018/0302783 | A1* | 10/2018 | Mestanov ............... H04W 8/22 |
| 2018/0337823 | A1 | 11/2018 | Zhang et al. |
| 2019/0104411 | A1 | 4/2019 | Hotchkiss et al. |
| 2020/0329384 | A1 | 10/2020 | Rusackas et al. |
| 2021/0029559 | A1 | 1/2021 | Agarwal et al. |
| 2021/0076216 | A1 | 3/2021 | Hotchkiss et al. |

(Continued)

*Primary Examiner* — Shantell L Heiber
(74) *Attorney, Agent, or Firm* — Nicholas Martin; Greenberg Traurig, LLP

(57) ABSTRACT

A Wi-Fi network includes one or more Wi-Fi access points each comprising circuitry configured to: provide a plurality of virtual networks including a home network and a work network, each of the plurality of virtual networks being segmented in terms of visibility, connect to a corporate network via one or more secure tunnels, connect to one or more user devices, and route traffic for the one or more user devices based on which particular virtual network the one or more user devices are connected on.

20 Claims, 12 Drawing Sheets

(56) References Cited

U.S. PATENT DOCUMENTS

| | | |
|---|---|---|
| 2021/0144567 A1 | 5/2021 | Goswami et al. |
| 2021/0195441 A1 | 6/2021 | Agarwal et al. |
| 2021/0195442 A1 | 6/2021 | Agarwal et al. |
| 2021/0195443 A1 | 6/2021 | Agarwal et al. |
| 2021/0314238 A1 | 10/2021 | Cioffi et al. |
| 2022/0060474 A1* | 2/2022 | Trentini .............. H04L 63/0236 |

* cited by examiner

Wi-Fi NETWORK SUPPORTING MULTIPLE VIRTUAL NETWORKS

FIELD OF THE DISCLOSURE

The present disclosure generally relates to wireless networking systems and methods. More particularly, the present disclosure relates to systems and methods for Wi-Fi networks supporting multiple virtual networks, such as a personal network, a work network, etc.

BACKGROUND OF THE DISCLOSURE

Wi-Fi networks (i.e., wireless local area networks (WLAN) based on the IEEE 802.11 standards) are ubiquitous, and the primary network used in homes. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Wi-Fi is continuing to evolve with newer generations of technology, including IEEE 802.11a, 802.11b, 802.11g, 802.11n, 802.11ac, and 802.11ax (referred to as Wi-Fi 6/6E), and future Wi-Fi 7. Each generation of technology evolves the Wi-Fi Media Access Control (MAC) and Physical (PHY) layers to add more capabilities. In the case of IEEE 802.11 ax, orthogonal frequency-division multiple access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

Work From Home (WFH) is proliferating and expanding with flexible work options. Flexible work options can include home-based, off-site offices, hybrid (work both in the office and at home), and the like. In fact, Gartner predicts 47% of knowledge workers will work remotely by the end of 2022 (see Atwal et al., Forecast Analysis: Remote and Hybrid Workers, Worldwide, Gartner, Jun. 2, 2021, available online at www.gartner.com/en/documents/4002170). The most common approach for remote work is using a virtual private network (VPN) client on a user's device to tunnel into the corporate network, such as over a user's home Wi-Fi network. Disadvantageously, traffic for work has to contend with existing home traffic, corporate information technology (IT) has little visibility into the home Wi-Fi network, requires the user to log in, and the like. Further a VPN does not automatically set up all of the services that a user may have while at the office, rather it looks like a narrow tunnel back to the office, not as if the user is in the office.

Another common approach is a software defined wide area network (SDWAN) device deployed in the remote location, e.g., home. Disadvantageously, SDWAN devices are expensive to deploy as they have typically been designed for branch offices, not for individual home residences. Further, SDWAN devices require extra hardware and only carry corporate traffic, i.e., the networking path does not carry private network traffic at all.

BRIEF SUMMARY OF THE DISCLOSURE

The present disclosure relates to systems and methods for Wi-Fi networks supporting multiple virtual networks, such as a personal network, a work network, etc. In particular, the present disclosure includes configuration in access points enabling multiple virtual networks. That is, a single home Wi-Fi network can carry both private (personal) and corporate traffic. Corporate IT has visibility into the home Wi-Fi network with respect to the corporate Wi-Fi virtual network, while not having access to the personal Wi-Fi network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Wi-Fi networks supporting multiple virtual networks, such as a personal network, a work network, etc. In particular, the present disclosure includes configuration in access points enabling multiple virtual networks. That is, a single home Wi-Fi network can carry both private (personal) and corporate traffic. Corporate IT has visibility into the home Wi-Fi network with respect to the corporate Wi-Fi virtual network, while not having access to the personal Wi-Fi network.

§ 1.0 Wi-Fi Network Topologies

Figure 1:
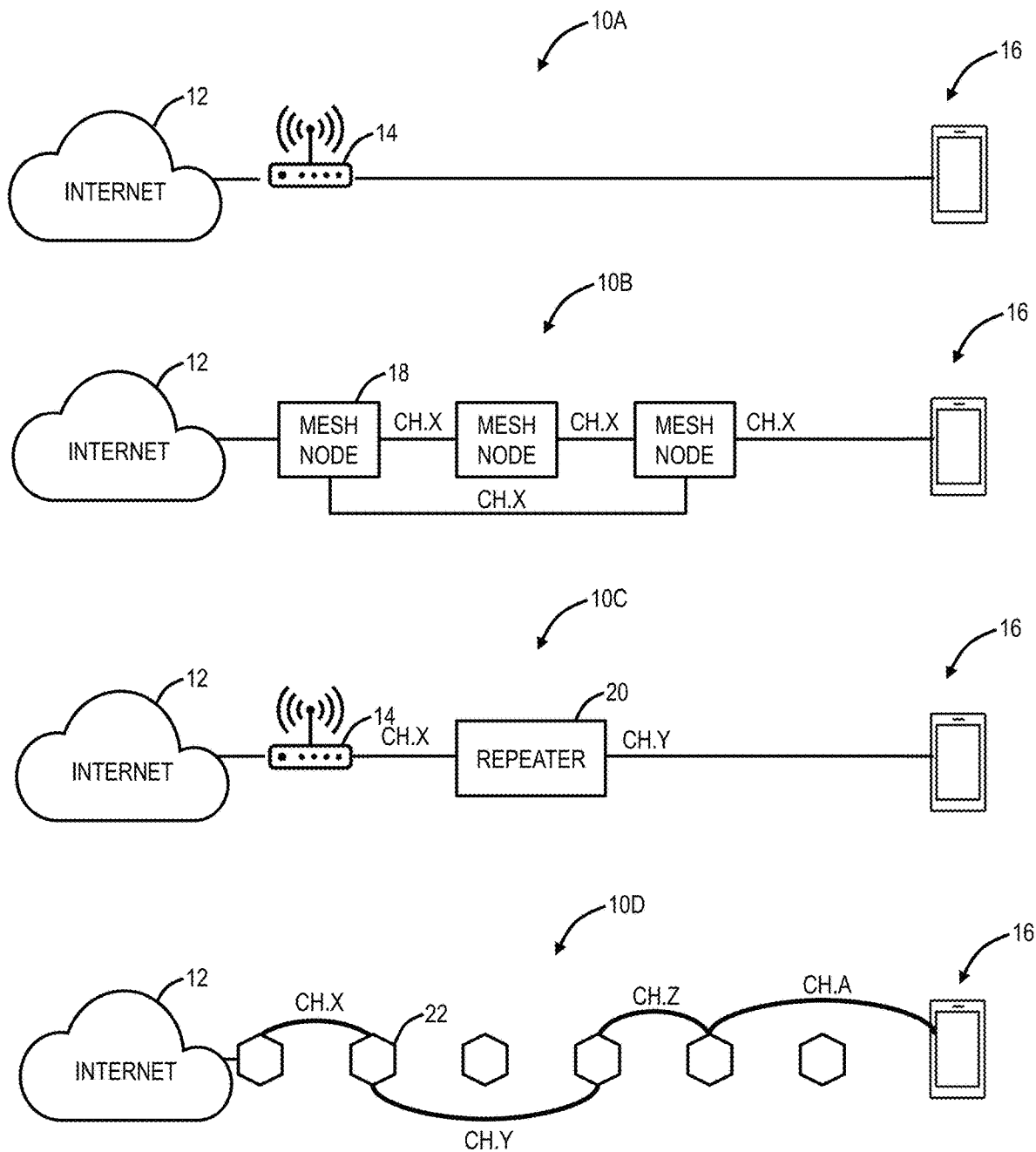
FIG. 1 is a network diagram of various Wi-Fi network topologies for connectivity to the Internet.

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 10C. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

§ 1.1 Cloud-Based Control

Figure 2A:
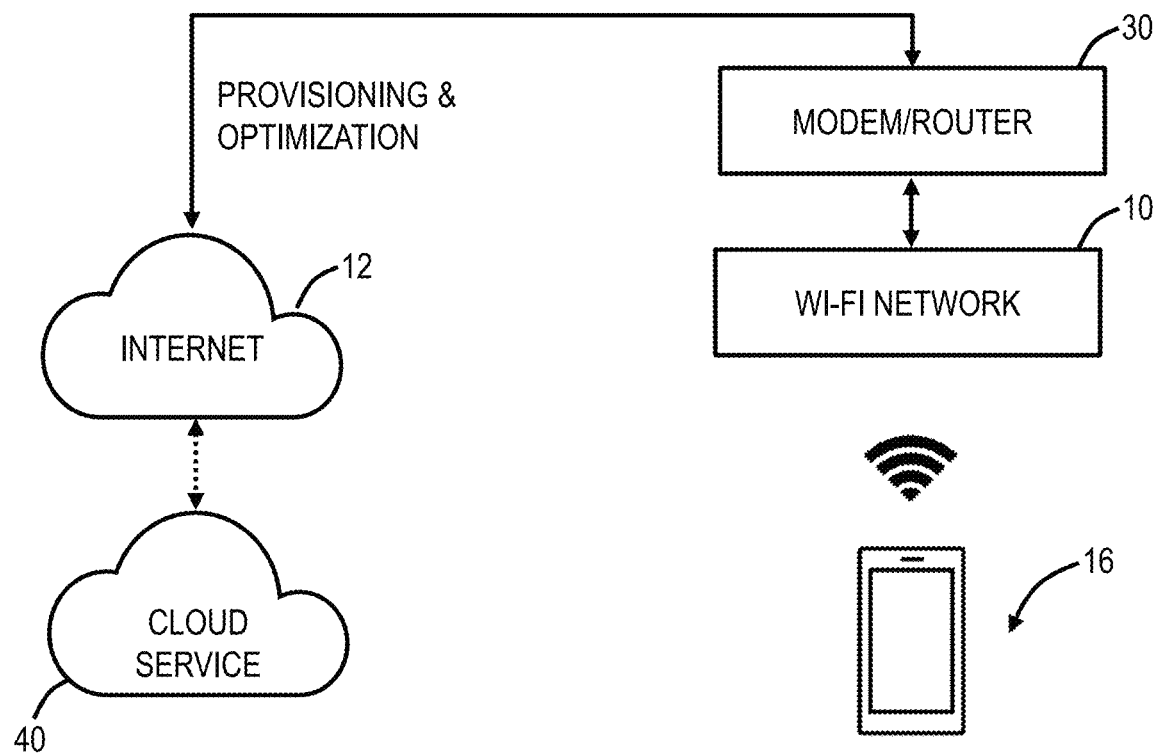
FIG. 2A is a network diagram of the Wi-Fi network with cloud-based control.

FIG. 2A is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 30 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Of note, cloud-based control can be implemented with any of the Wi-Fi networks 10, with monitoring through the cloud service 40. For example, different vendors can make access points 14, mesh nodes 18, repeaters 20, Wi-Fi devices 22, etc. However, it is possible for unified control via the cloud using standardized techniques for communication with the cloud service 40. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40. This is used to collect measurements and statistics from the connected Wi-Fi client devices 16 and network management elements, and to enable customized connectivity services.

As described herein, cloud-based management includes reporting of Wi-Fi related performance metrics to the cloud service 40 as well as receiving Wi-Fi-related configuration parameters from the cloud service 40. The systems and methods contemplate use with any Wi-Fi network 10. The cloud service 40 utilizes cloud computing systems and methods to abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

§ 1.2 Distributed Wi-Fi Network

Figure 2B:
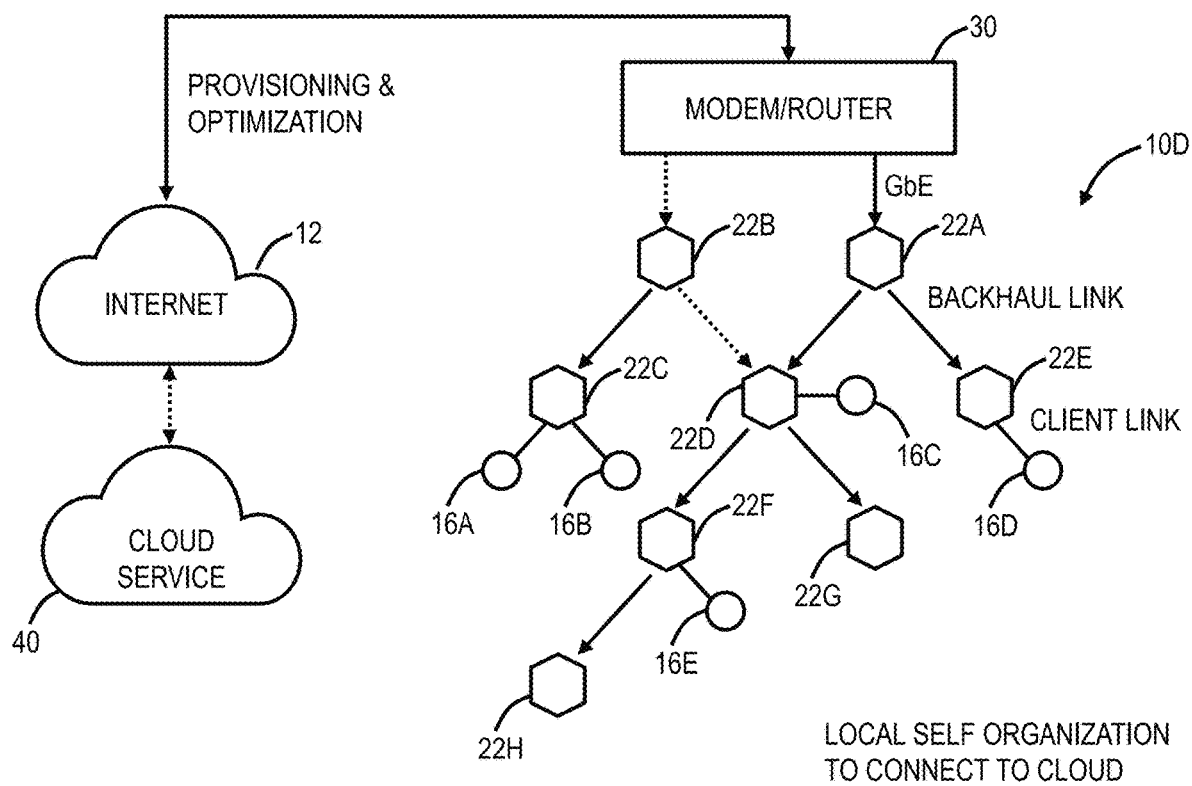
FIG. 2B is a network diagram of an example implementation of the Wi-Fi network, as a distributed Wi-Fi network in a tree topology.

FIG. 2B is a network diagram of an example implementation the Wi-Fi network 10D, as a distributed Wi-Fi network in a tree topology. The distributed Wi-Fi network 10D includes a plurality of access points 22 (labeled as access points 22A-22H) which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2B, the access point 22A has an exemplary gigabit Ethernet (GbE) wired connection to the modem/router 30. Optionally, the access point 22B also has a wired connection to the modem/router 30, such as for redundancy or load balancing. Also, the access points 22A, 22B can have a wireless connection to the modem/router 30. Additionally, the access points 22A, 22B can have a wireless gateway such as to a cellular provider as is described in detail herein. The access points 22 can have wireless links for client connectivity (referred to as a client link) and for backhaul (referred to as a backhaul link). The distributed Wi-Fi network 10D differs from a conventional Wi-Fi mesh network in that the client links and the backhaul links do not necessarily share the same Wi-Fi channel, thereby reducing interference. That is, the access points 22 can support at least two Wi-Fi wireless channels—which can be used flexibly to serve either the client link or the backhaul link and may have at least one wired port for connectivity to the modem/router 30, or for connection to other devices. In the distributed Wi-Fi network 10D, only a small subset of the access points 22 require direct connectivity to the modem/router 30 with the non-connected access points 22 communicating with the modem/router 30 through the backhaul links back to the connected access points 22A, 22B. Of course, the backhaul links may also be wired Ethernet connections, such as in a location have a wired infrastructure.

§ 2.0 Access Point

Figure 3A:
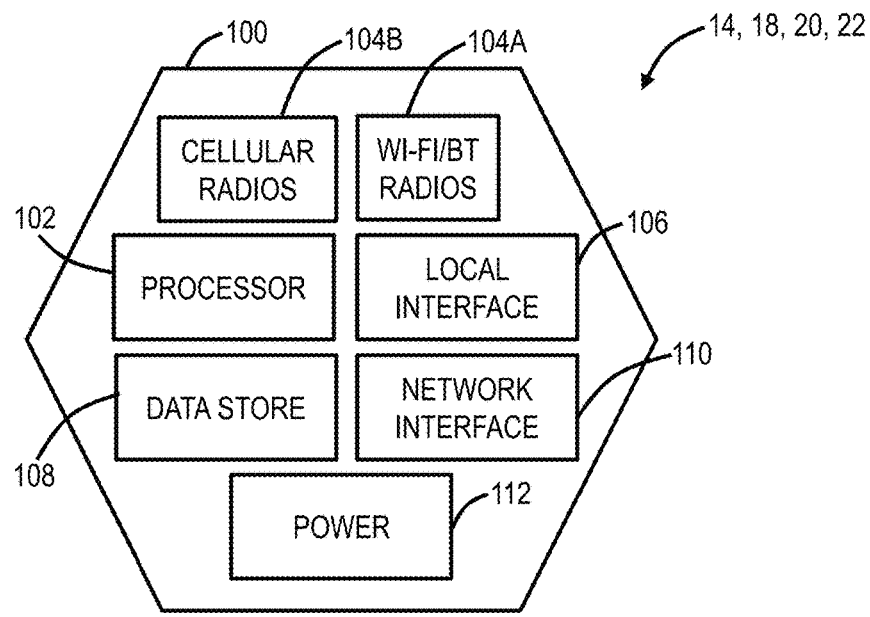
FIG. 3A is a block diagram of functional components of the access points, mesh nodes, repeaters, etc., in the Wi-Fi networks of FIG. 1.

FIG. 3A is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3A depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104B can operate according to the IEEE 802.11 standard. The radios 104B support cellular connectivity such as Long-Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104B such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access.

Also, the radios 104A, 104B include antennas designed to fit in the form factor 100. An example is described in commonly-assigned U.S. patent Ser. No. 17/857,377, entitled "Highly isolated and barely separated antennas integrated with noise free RF-transparent Printed Circuit Board (PCB) for enhanced radiated sensitivity," filed Jul. 5, 2022, the contents of which are incorporated by reference in their entirety.

The local interface 106 is configured for local communication to the node and can be either a wired connection or wireless connection such as Bluetooth or the like. Since the node can be configured via the cloud service 40, an onboarding process is required to first establish connectivity for a newly turned on node. In an embodiment, the node can also include the local interface 106 allowing connectivity to a Wi-Fi client device 16 for onboarding to the Wi-Fi network 10 such as through an app on the user device 16. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 30. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Also, those skilled in the art will appreciate there can be various physical implementations which are contemplated herein. For example, in some embodiments, the modem/router 30 can be integrated with the access point 14, 18, 22. In other embodiments, just a router can be integrated with the access point 14, 18, 22 with separate connectivity to a modem.

§ 2.1 OpenSync

Figure 3B:
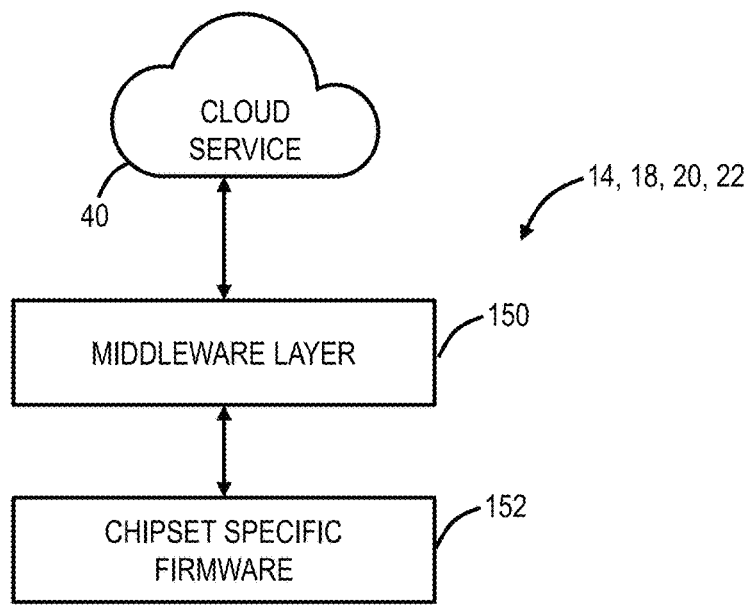
FIG. 3B is a logical diagram of the access points, mesh nodes, repeaters, etc. with a middleware layer to enable operation with the cloud service.

FIG. 3B is a logical diagram of the access points 14, mesh nodes 18, repeaters 20, etc. ("node") with a middleware layer 150 to enable operation with the cloud service 40. Of note, the present disclosure contemplates use with any vendor's hardware for the access points 14, mesh nodes 18, repeaters 20, etc. with the addition of the middleware layer 150 that is configured to operate with chipset specific firmware 152 in the node. In an embodiment, the middleware layer 150 is OpenSync, such as describe in www.opensync.io/documentation, the contents of which are incorporated by reference. Again, OpenSync is cloud-agnostic open-source software for the delivery, curation, and management of services for the modern home. That is, this provides standardization of the communication between devices and the cloud service 40. OpenSync acts as silicon, Customer Premises Equipment (CPE), and cloud-agnostic connection between the in-home hardware devices and the cloud service 40.

The middleware layer 150 spans across layers from just above the firmware drivers to the cloud connection for the cloud service 40. The middleware layer 150 is software operates with the following device segments:

Measurements/Statistics/Telemetry
Collecting measurements reported by the low-level drivers
Compiling and pre-processing the measurements into statistics that are uniform across different devices
Presenting the statistics using standardized formats
Preparing the formatted statistics for transfer to the cloud using serialization and packetizing
Communicating the statistics to the cloud using standardized and efficient telemetry
Management/Control
Defining a standard interface for control messaging from the cloud service 40
Providing operations necessary to manage the services, such as onboarding and provisioning
Providing rules-based networking configurations to block, filter, forward, and prioritize the messages
Implementing software to manage the device maintenance functions, including logging, firmware upgrades, and debugging
Cloud-managed Services
Wi-Fi, including mesh networks that dynamically adapt to their environments
User access management
Cybersecurity
Parental controls
IoT device management
Additional services Through use of the middleware layer 150, it is possible to have various different vendor devices operate with the cloud service 40.

§ 2.2 Virtual Network Functions (VNF) on the Access Points

In addition to the middleware layer 150, the present disclosure contemplates the ability for the cloud service 40 to add applications, features, etc. on the nodes. In the present disclosure, the node is configured to maintain tunnels to the corporate network as well as support forwarding based on virtual networks.

§ 2.3 SDN and OpenFlow

In an embodiment, the cloud service 40 can use software defined network (SDN) such as via OpenFlow to control the Wi-Fi networks 10 and the corresponding access points. OpenFlow is described at opennetworking.org and is a communications protocol that gives access to the forwarding plane of a network switch or router over the network. In this case, the forwarding plane is with the access points and the network is the Wi-Fi network 10. The access points and the cloud service can include with OpenFlow interfaces and Open vSwitch Database Management Protocol (OVSDB) interfaces. The cloud service 40 can use a transaction oriented reliable communication protocol such as Open vSwitch Database Management Protocol (OVSDB) to interact with the Wi-Fi networks 10.

The present disclosure includes multiple virtual networks in the Wi-Fi network 10 and one implementation can include SDN such as via OpenFlow.

§ 3.0 Cloud Server and User Device

Figure 4:
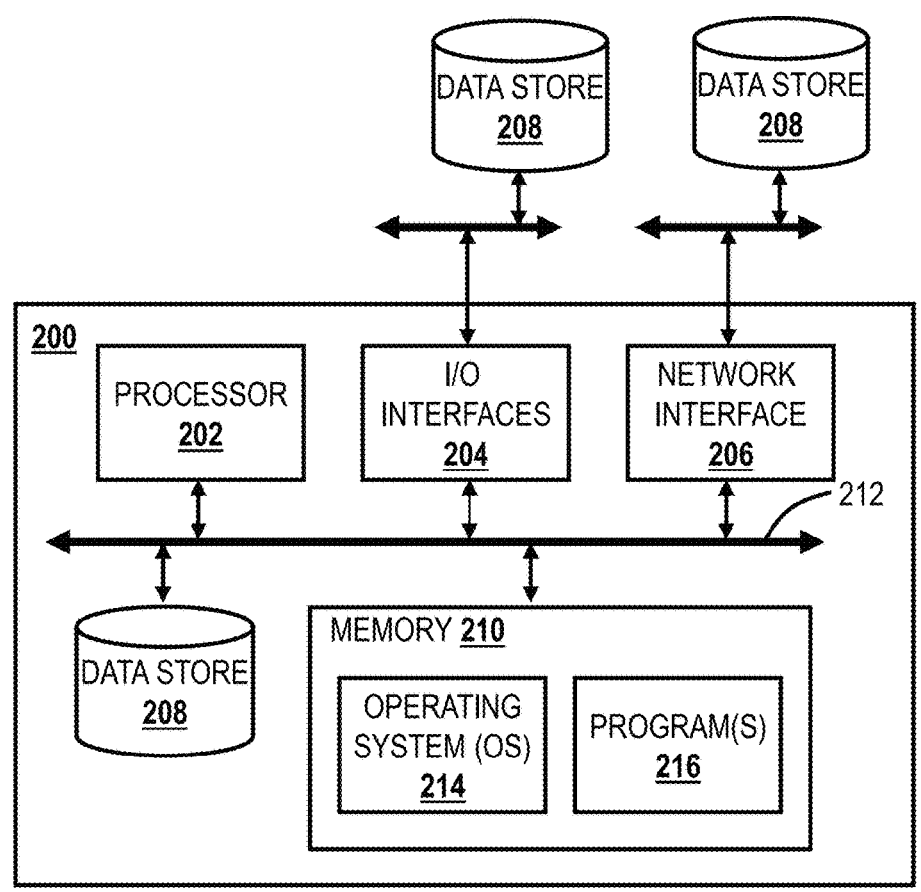
FIG. 4 is a block diagram of functional components of a server, a Wi-Fi client device, or a user device that may be used with the Wi-Fi network of FIG. 1 and/or the cloud-based control of FIG. 2A.

FIG. 4 is a block diagram of functional components of a server 200, a Wi-Fi client device 16, or a user device that may be used with the Wi-Fi network of FIG. 1 or 2B, and/or the cloud-based control of FIG. 2A. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

§ 4.0 Wi-Fi Network with Wired and Wireless Connectivity

Again, the wireless access points 14, 18, 22 include both the Wi-Fi radios 104A, the cellular radios 104B, and the network interface 110. The network interface 110 can include an Ethernet connection to the modem/router 30. In an embodiment, the cellular radios 104B can provide a backup connection to the Ethernet connection, for connectivity to the Internet. Of note, the access point 14, 18, 22 with the cellular radios 104B can be referred to as a gateway 30A node. That is, the term gateway 30A is meant to cover any access point 14, 18, 22, modem/router, etc. or combination thereof that enables connectivity to the Internet 12 for the Wi-Fi network 10. Note, in some embodiments, a modem is separate from the access point 14, 18, 22. In other embodiments, the access point 14, 18, 22, include a router. In still other embodiments, the access point 14, 18, 22 can include a modem/router. Those skilled in the art will recognize various approaches are contemplated and all such equivalents are considered herewith.

Figure 5:
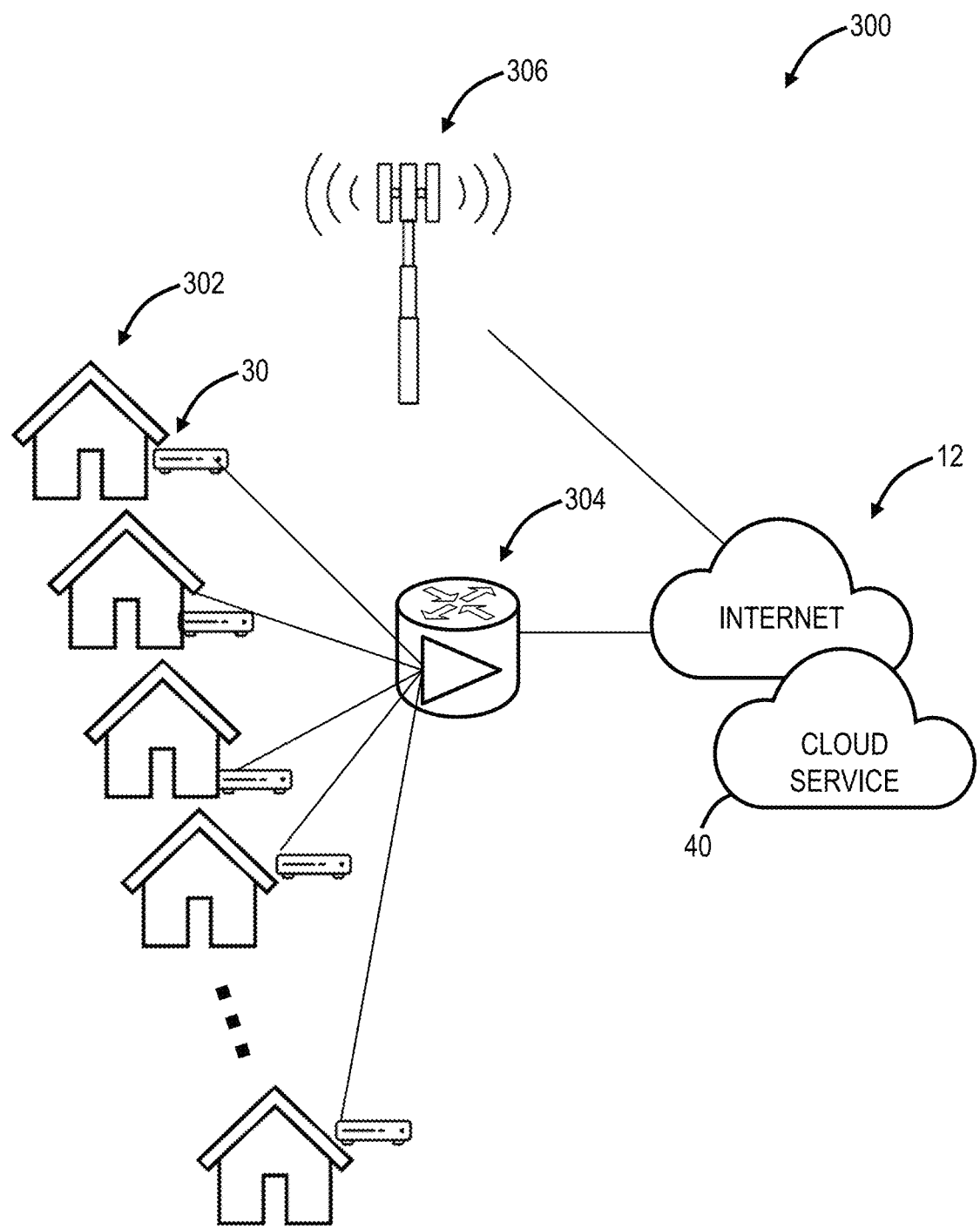
FIG. 5 is a network diagram of a portion of a network associated with a network operator.

FIG. 5 is a network diagram of a portion of a network 300 associated with a network operator. In this example, the network operator includes both wired and wireless broadband in the same geographical area, represented by homes 302. For example, the wired broadband can be via modems/routers 30 that can connect ultimately to a cable modem termination system (CMTS) 304 (or some other type of wired infrastructure, e.g., DSL, Passive Optical Network (PON), Hybrid Fiber Coax (HFC), etc.), and the wireless broadband can be via fixed wireless access via the cellular radios 104B in the access points 14, 18, 22 that connect to a base station 306 (e.g., eNodeB, gNodeB, etc.). It would be advantageous to support failover to the wireless broadband in the case of a wired broadband failure, providing reliability, uptime, and high service level agreement (SLA) support. In the case of a single outage, this is not an issue on the wireless network. However, often wired failures are geographically localized. For example, failure of the CMTS 304 causes a burden on the base station 306 because the wired broadband failure is geographically localized to the homes 302. This could dramatically put a burden on the base station 306 or other cellular cells in the area, leading to degradation of services for all mobile users in the area. That is, wired broadband outages tend to be localized and using wireless broadband for failover could inundate the cellular network.

§ 4.1 Fixed Wireless Access System

Figure 6:
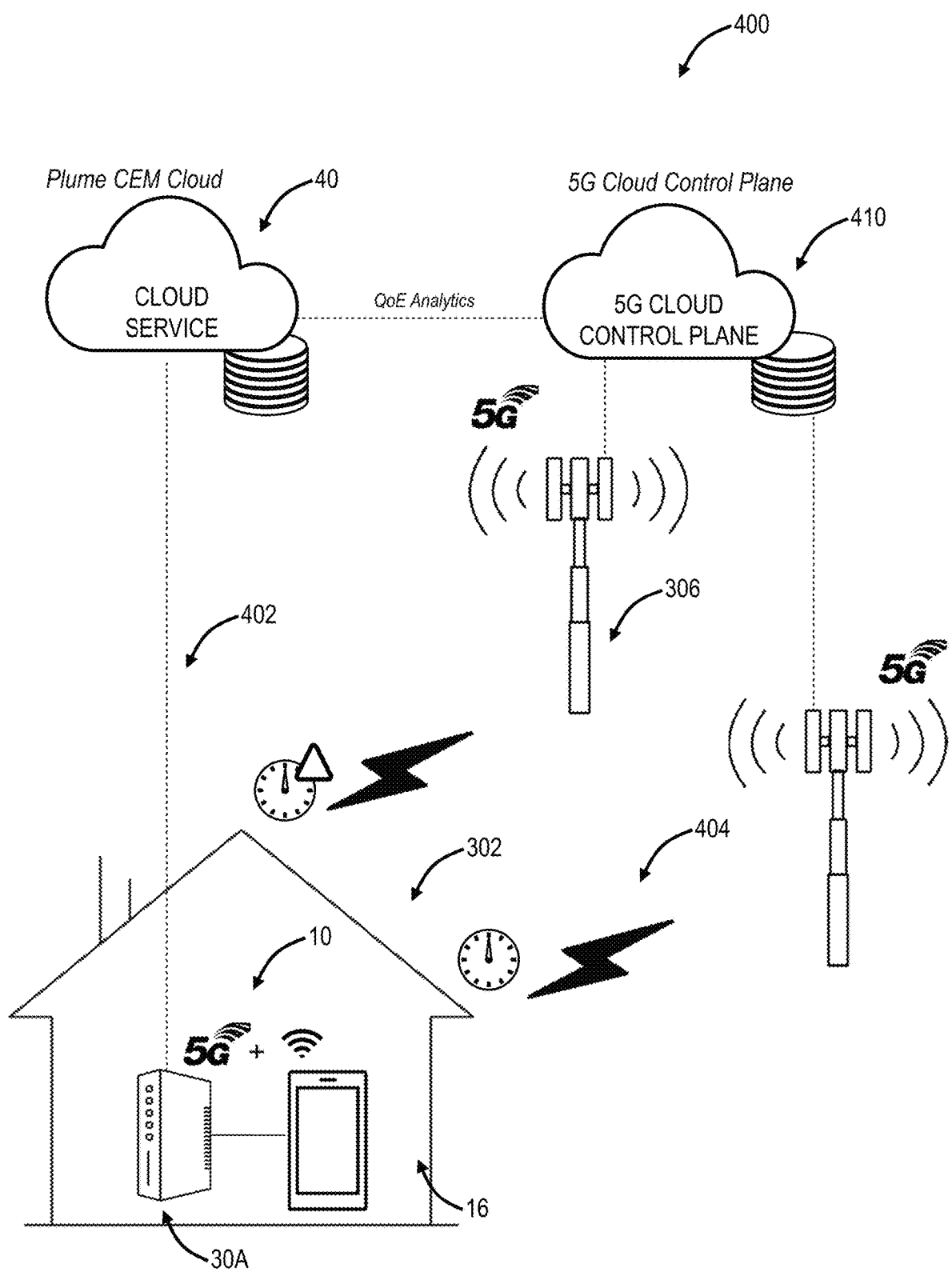
FIG. 6 is a diagram of a fixed wireless access system for wired and/or wireless connectivity.

FIG. 6 is a diagram of a fixed wireless access system 400 for wired and/or wireless connectivity. For illustration purposes, the fixed wireless access system 400 is illustrated with a single home 302 having a modem/router 30 and a Wi-Fi client device 16. Those skilled in the art will recognize the fixed wireless access system 400 contemplates multiple locations, including homes, businesses, store, library, mall, sporting area, or any location where a Wi-Fi network 10 is deployed. Further, the fixed wireless access system 400 contemplates use with various different Wi-Fi networks 10, with various different network operators, etc. Also, the fixed wireless access system 400 contemplates use with any of the various wired and/or wireless connectivity schemes described herein.

The cloud service 40 is configured to connect to the Wi-Fi network 10, either via a wired connection 402 and/or a wireless connection 404. In an embodiment, the cloud service 40 can be utilized for configuration, monitoring, and reporting of the Wi-Fi networks 10 in the homes 302 or other locations. The cloud service 40 can be configured to detect outages such as for the wired connections 402. For example, this functionality is described in commonly-assigned U.S. patent application Ser. No. 17/700,782, filed Mar. 22, 2022, and entitled "Intelligent monitoring systems and methods for Wi-Fi Metric-Based ISP Outage Detection for Cloud Based Wi-Fi Networks," the contents of which are incorporated by reference in their entirety.

Also, the cloud service 40 can connect to a 5G cloud control plane 410 and can determine 5G to Wi-Fi quality of experience (QoE) monitoring and application prioritization controls for increased service consistency. QoE analytics can be shared with 5G cloud control plane 410 for network optimization feedback.

In an embodiment, the access points 14, 18, 20, 22 and/or gateway 30A can include OpenSync support for communicating with the cloud service 40.

§ 5.0 Work from Anywhere Service Via the Nodes and the Cloud Service

The present disclosure includes a work from anywhere (WFA) approach with the cloud service 40 and the associated nodes and Wi-Fi networks 10. The objective is to offer the home user various features associated with the cloud service 40 for personal use, extend the corporate network to the home, and to provide corporate IT security, compliance, and support for the virtual corporate network. The virtual corporate network can include prioritization of the traffic and encrypted tunneling of the traffic, from the node hardware. The Wi-Fi network 10, through the cloud service 40, is configured for strict separation of the visibility of the home and corporate network in terms of visibility by corporate IT. The home user has visibility of both the home and corporate network such as through a mobile app whereas corporate IT only has visibility of the corporate network. Note, as described herein, the Wi-Fi network 10 supports virtual networks and two such examples are a home (personal) network and a corporate network. Of course, there can be other virtual networks, such as a guest network. Each virtual network is on the same hardware, but has a different SSID.

Figure 7:
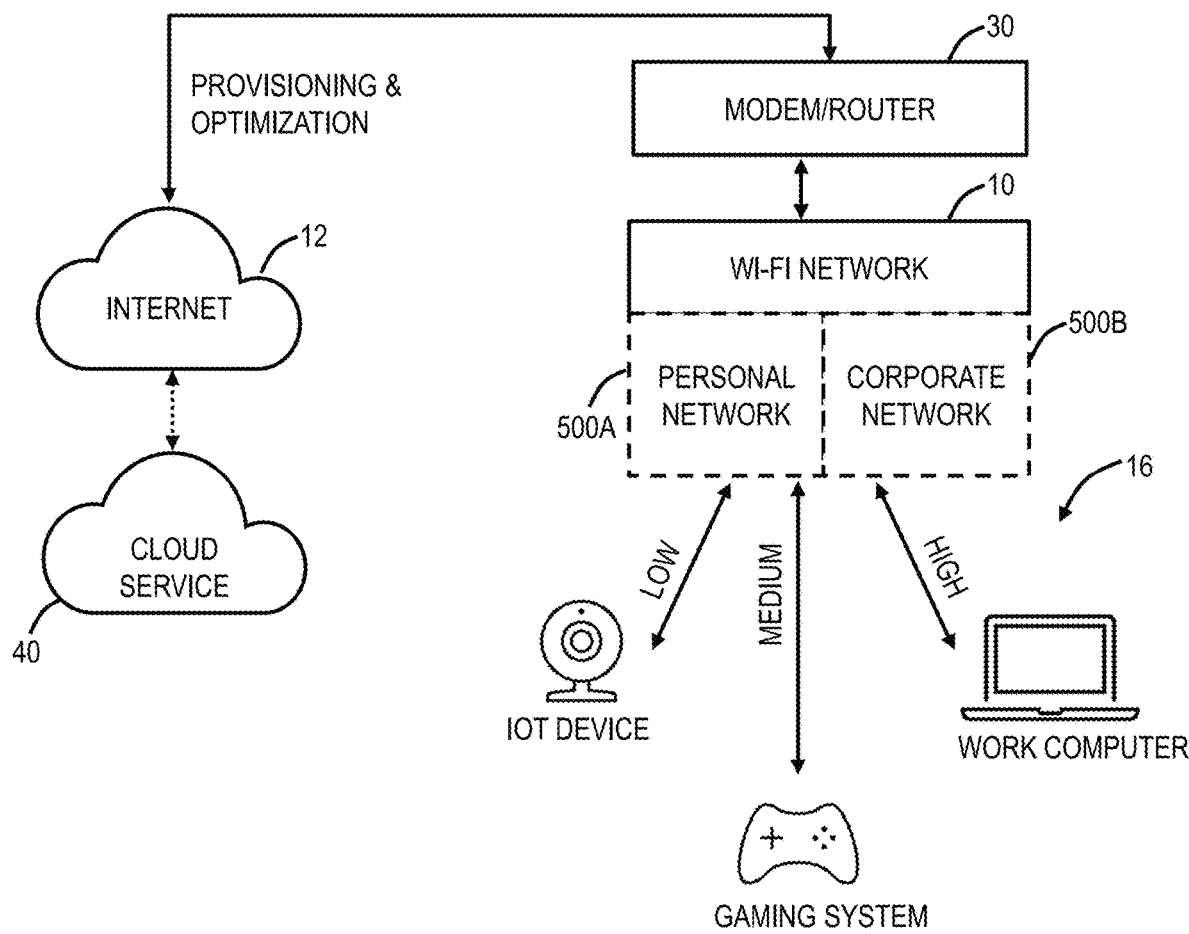
FIG. 7 is a network diagram of a Wi-Fi network that has virtual networks configured therein.

FIG. 7 is a network diagram of a Wi-Fi network 10 that has virtual networks 500A, 500B configured therein. The Wi-Fi network 10 can be any of the Wi-Fi networks 10A-10D as well as any different configurations, and the Wi-Fi network 10 can include the access point 14, the mesh node 18, the repeater 20, the Wi-Fi device 22, and combinations thereof, which are referred to herein collectively as Wi-Fi nodes or simply nodes in the Wi-Fi network 10. The virtual networks 500A, 500B are configured on the Wi-Fi nodes, as opposed to a user device 16. That is, a specific user device 16 can concurrently send traffic to any of the virtual networks 500A, 500B. For example, a user can send work traffic via the virtual network 500B and personal, non-work traffic via the virtual network 500A, concurrently.

Note, for illustration purposes, the present disclosure describes two example virtual networks 500A, 500B, such as a personal network and a corporate network. Those skilled in the art will recognize there can be more virtual networks 500 as well as different virtual networks 500. The virtual networks 500 can be user and/or IT configurable. In an embodiment, there can be different quality of experience (QoE) and/or quality of service (QoS) configurations for the different virtual networks 500A, 500B. For example, for work at home, it is desirable to provide a high QoE for corporate traffic, e.g., video conferencing and the like. Also, it would be desirable to provide lower QoE for personal traffic, e.g., gaming, IoT, streaming media, etc. In the example of FIG. 7, an IoT device is given low priority, a gaming system is given medium priority, and the work computer is given high priority. Of course, there can be various, configurable priority levels.

The prioritization can be on an application level, e.g., prioritize by application across both private and corporate network. It is also possible to prioritize the same application (e.g., Zoom) differently if two sessions are running one on personal network and one on the corporate network. The prioritization can be done on both in-home network and access network. Capacity reservations can be made on both the personal and corporate network, considering applications and traffic on both. The reservations could be static or dynamic.

§ 5.1 Virtual Networks Premise

The objective of the present disclosure is to provide a single networking system, i.e., the Wi-Fi network 10, to support both a private/home network and a corporate work network as two virtual networks 500A, 500B. In addition, the cloud service 40 is available for configuration, monitoring, etc.

The virtual network 500A is a user's personal network whereas the virtual network 500B is also the user's work network which looks and works just like the user was physically in the office. The Wi-Fi node is configured with software and/or firmware which supports both the virtual networks 500A, 500B. It is also contemplated that an existing Wi-Fi node currently operating can be upgraded in the field with a software update to support the virtual networks 500A, 500B.

The Wi-Fi node/Wi-Fi network 10 is configured to perform security tunneling to ensure security for the corporate network. There is traffic isolation between the two virtual networks 500A, 500B that prevents the corporation from seeing private traffic and the private network from seeing the corporate traffic. The corporate IT organization can observe, configure, and control the corporate network, but not the private network. The employee can observe, configure, and control the private network, but might have limited visibility or control of the corporate network. Prioritization can be configured and applied to prioritize the traffic on the personal network above (or below) the corporate network, same for capacity reservations.

Also, traditionally the corporate network is an arrangement between the corporation and the employee. It does not involve the service provider/carrier which is viewed just as a generic pipe. In this case, the service provider can be part of the arrangement and can participate in the control, monitoring, prioritization, bandwidth allocation, etc. of either the private or corporate network, or both, via the cloud service 40.

§ 5.2 Enterprise Security and Encryption

Figure 8:
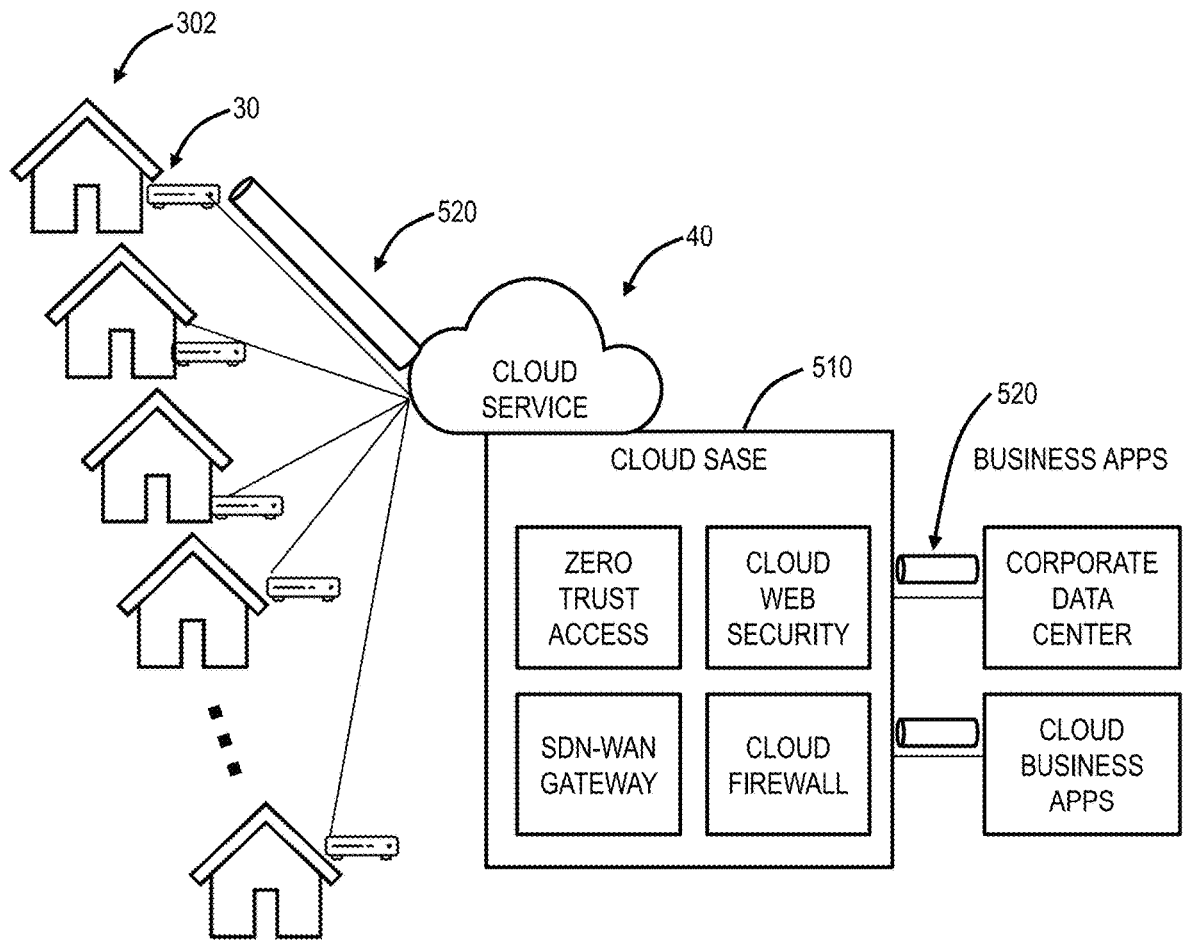
FIG. 8 is a network diagram of the cloud service interconnected to homes for acting as a secure access service edge (SASE) for a corporate virtual network.

FIG. 8 is a network diagram of the cloud service 40 interconnected to homes 302 for acting as a secure access service edge (SASE) 510 for a corporate virtual network 500B. The cloud service 40, for the corporate virtual network 500B can act as a SASE 510 providing zero trust access (ZTA), cloud web security (such as a secure web gateway (SWG)), an SDN-WAN gateway, and a cloud firewall. There are secure tunnels 520 over which corporate traffic on the corporate virtual network 500B can be securely routed to a corporate data center, to cloud business apps, etc. and through the SASE 510. This extends corporate IT security into the home 302.

§ 5.3 Access Point Hardware for Virtual Networks

Of note, the virtual networks 500A, 500B described herein are provided via the same hardware, i.e., the access point 14, the mesh node 18, the repeater 20, the Wi-Fi device 22, the mobile hotspot 530, and combinations thereof. Further, this can include hardware that is already in the field, that is upgraded with a software update. Existing systems such as branch office SD-WAN devices are provided with new hardware dedicated, or set up specifically for this task, rather than re-tasking existing hardware in the field, and this hardware only supports the corporate network.

The software is configured to adapt to the present hardware, such as via the middleware layer. This is needed since the Wi-Fi networks 10 include a wide range of different hardware vendors. The adaptation can include selecting the type of encryption to use for the tunnels 520.

The virtual networks 500A, 500B also can work on multi-access point systems, such as a mesh Wi-Fi network 10B, the Wi-Fi network 10D, and the like. The hardware configuration for the virtual networks 500A, 500B is extended to all devices in the Wi-Fi network 10, including over wireless backhaul connections.

§ 5.3 Mobile Hotspots

Figure 9:
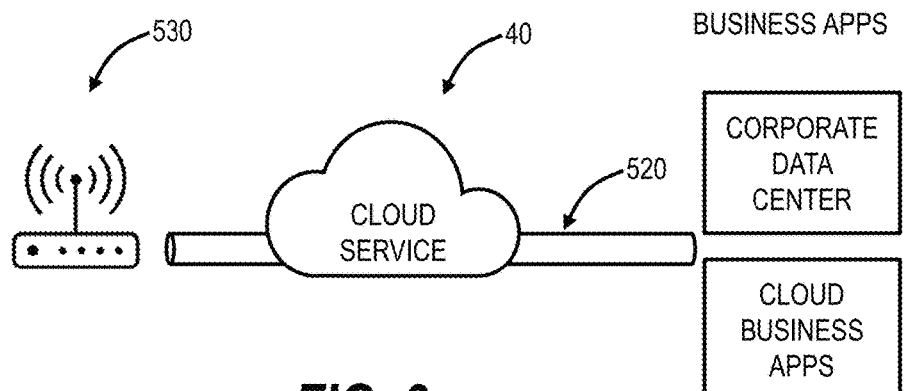
FIG. 9 is a network diagram of a mobile hotspot which can also be used to provide the multiple virtual networks.

FIG. 9 is a network diagram of a mobile hotspot 530 which can also be used to provide the multiple virtual networks 500A, 500B. One application here is to use the mobile hotspot 530 as a portable office, enabling a true work from home anywhere. For example, at a conference, trade show, etc., the mobile hotspot 530 can be deployed to extend the office. The mobile hotspot 530 is an access point with portability (e.g., battery) and wireless access (i.e., such as similar to the cellular gateway 30A). The hardware can also include a mobile hotspot—a device that is portable and the person carries with them, causing both their private network and the corporate network to come with them wherever they go. This mobile hotspot could use cellular to connect back to the Internet or could use Wi-Fi to connect to a public hotspot, while also using the "fronthaul" Wi-Fi to connect to the employee's devices presenting both the corporate network and the private network.

§ 5.4 Segmented Network Control

There is segmented network control between the virtual networks 500A, 500B, such as between the user (i.e., homeowner), corporate IT, and/or a service provider (through the cloud service 40). In an embodiment, the user controls the personal virtual network 500A, and the corporate IT controls the corporate virtual network 500B, but other embodiments are also contemplated.

The user can set the personal virtual network 500A password, SSID (network name), guest passwords, security policies, content access limits, time of day use, Internet freeze, prioritization of traffic within the private network, networking configuration such as exposing ports, etc. In the case of the corporate virtual network 500B, corporate IT can control all the items listed above. The user generally would not have control of the corporate virtual network 500B, except perhaps for enabling or disabling the corporate virtual network 500B. Another thing they might control is the time of day access to the corporate virtual network 500B.

Access for the corporate network could be based on Wi-Fi Protected Access (WPA) Enterprise, which has username+ password, or can use certificates. Certificates would limit which devices get on the corporate virtual network 500B to only those approved by the corporation. Username+password would allow a consumer to put other devices onto the corporate virtual network 500B.

§ 5.5 App

In general, a single app, such as a mobile app, desktop app, etc., supports both the corporate virtual network 500B and the personal virtual network 500A. In an embodiment, the single app is a mobile app and it is used to set up both virtual networks 500A, 500B, even if the corporate virtual network 500B is automatically pre-configured from the cloud service 40. For example, the corporate virtual network 500B can have a first set of configuration that is from corporate IT via the cloud service 40, and a second set of configuration that is less than the first set and available for the user to set, such as via the mobile app. For example, the first set of configuration can define security, encryption, SSID, WPA settings, device certificates, etc., and the second set of configuration can include enabling the corporate virtual network 500B, prioritization, time of day, etc.

In the mobile app, the user can see which devices 16 are on the personal virtual network 500A and the corporate virtual network 500B, including configuration of the networks 500A, 500B, connection status, etc. It is also possible to include performance of the corporate tunnel 520 (speed tests) as well as the speed tests to public servers for the private virtual network 500A.

The mobile app can also include privacy control—people may fear they are being spied on by corporate IT. The mobile app includes capability for the employee to approve or deny the corporation requesting to observe things that are going on in the corporate virtual network 500B. The private virtual network 500A is completely hidden from corporate IT including any activity thereon. Also, the mobile app can include the ability for the employee to gate the observability of the corporate virtual network 500B to the corporation for a period of time, such as during office hours.

The mobile app can include authentication techniques for the employee (e.g., two factor, biometric) with a database at the corporation (e.g., using corporate authentication service) in order to provide policies including access to the corporate virtual network 500B.

Figure 10:
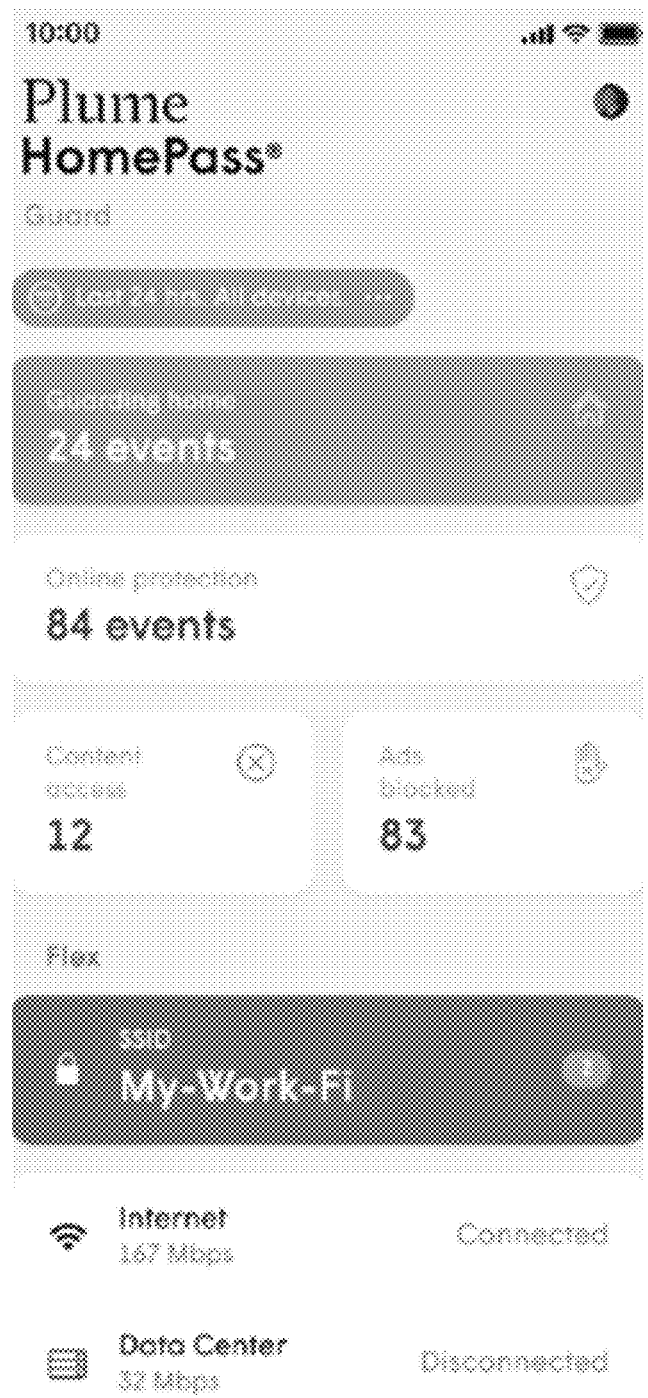
FIG. 10 is an example screenshot of a mobile app for managing the Wi-Fi network.

In an embodiment, the mobile app is HomePass, available from the Applicant, Plume Design, Inc., and FIG. 10 is an example screenshot of a mobile app. Example features of the mobile app include, without limitation:

Wi-Fi hardware is discovered over Bluetooth so the system is up and running in minutes Intuitive self-install feature, which eliminates the need for technician costs and scheduling Advanced, automatic identification of devices in the home, complete with icons and names.

View how the network is connecting with a visual topology representation of all access points and connected devices Creates flawless connectivity across device types, rooms, and complex environments using AI-based optimization Provides complex network visibility with unique device fingerprinting and speed tests The cloud-coordinated system harmonizes legacy deployments via OpenSync-compatible hardware Privacy Manager to temporarily freeze visibility Parental control tools to set healthy boundaries for access and usage Guest Manager for access permissions and passwords Content Manager to filter and block unwanted websites and ads for parents and more Digital Wellbeing monitors screen time with scheduled freezes and pauses Online protection from malicious content— Learn more about protecting homes in the connected age Real-time threat database IoT anomaly detection and device quarantine Intrusion detection and outside threat blocking Motion detection via radio waves to let subscriber-owned devices become sensors to detect expected and unexpected movement No need to remember to enable the system, the system turns on and off automatically through GPS of primary devices See movement patterns over the course of time within the mobile app

§ 5.6 Network Operations Center Dashboard

In addition to the mobile app, there is a network operations center (NOC) dashboard, an example of which is described in U.S. patent application Ser. No. 16/897,371, filed Jun. 10, 2020, and entitled "Network operation center dashboard for cloud-based Wi-Fi systems," the contents of which are incorporated by reference in their entirety. The NOC dashboard can be available via the cloud service 40 and can be used by a service provider (e.g., cable provider, Internet provider) as well as by corporate IT. There can be segmentation in the NOC dashboard, e.g., a service provider can see all users in its network whereas corporate IT can only see its employees. In this sense, the NOC dashboard via the cloud service 40 can be multi-tenant.

In an embodiment, there can be two NOC dashboards—one for service providers for visibility of all networks of its users, including both the personal virtual network 500A and the corporate virtual network 500B, and one for corporate IT for visibility of its associated corporate virtual networks 500B. Visibility in the NOC dashboard can be based on login credentials to determine what will be seen when in the dashboard. This may be only the corporate network, the private network, or both. This one dashboard may be accessed by the corporation, or it may be accessed by the service provider, and based on their log in credentials you can see (or not see) types of information. In an embodiment, there is a single NOC dashboard for a given corporation that anyone can log into and get visibility/control based on the role associated with their login credentials. In another embodiment, there is a NOC dashboard for the service provider that is used to view only the personal virtual network 500A of the Wi-Fi network 10. For example, the service provider can be excluded from viewing the corporate virtual networks 500B for security.

Figure 11:
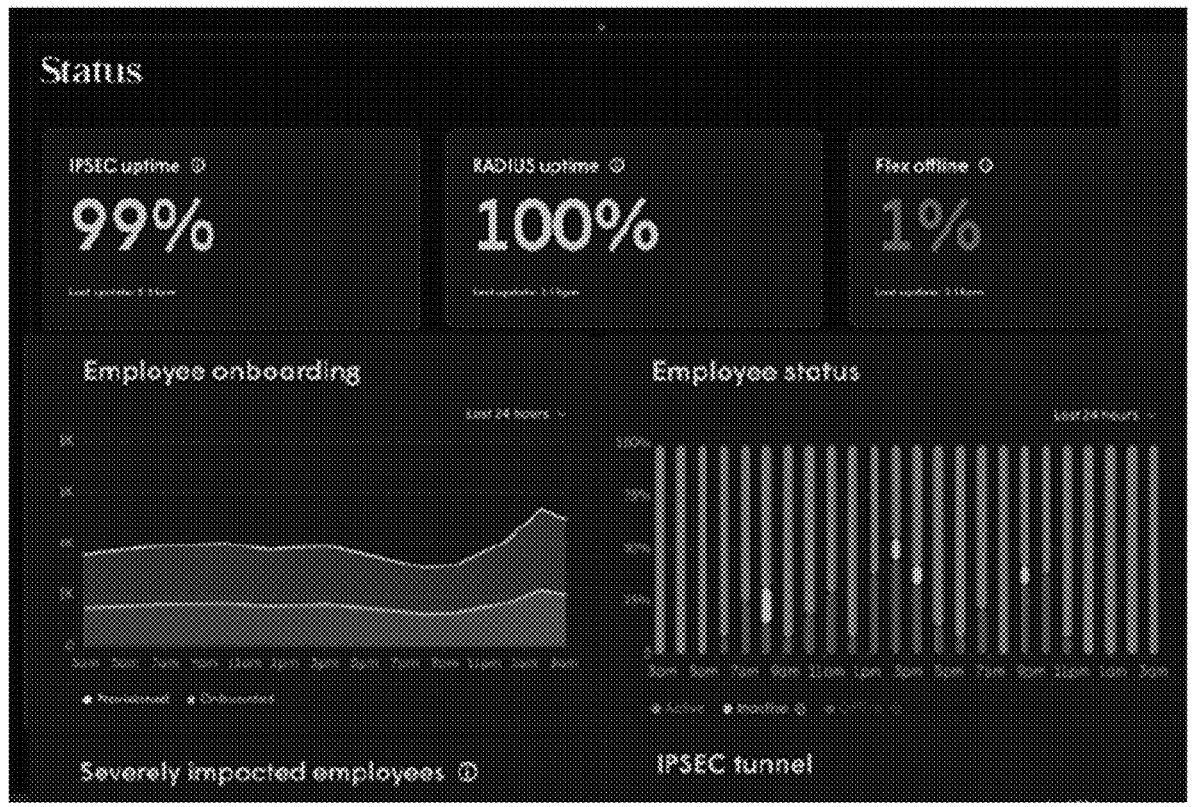
FIG. 11 is an example screenshot of a NOC dashboard.

FIG. 11 is an example screenshot of a NOC dashboard for corporate IT. This can include a panorama style (aggregated data) dashboard. This can present rollup information such as a number of employees connected on the corporate network, how many have what level of performance in their network, status of Internet Protocol (IP) Secure (IPSec) tunnels, locations that are offline, etc. is provided to the corporation. It is also possible to track installation/setup status—what percentage of employees have actually set their system up. This could be a completely separate dashboard, but it could also be a tab within the NOC type dashboard described earlier. For example, corporate IT can provide the Wi-Fi network 10 to the user or the software to update an existing Wi-Fi system 10.

For the service provider, unlike traditional SD-WAN that is a relationship between the corporation and the employee, in which the service provider is just a generic pipe that is not involved or aware, the service provider can be involved in the following ways:

Can allocate/reserve broadband bandwidth for the corporate traffic

Can fix a route for the corporate network that is optimal

Offer low latency and high BW service for the corporate traffic above and beyond what the employee or private network would get based on their subscription.

Effectively the service provider can bundle private line service together with the Flex SD-WAN like service if they want to

§ 5.7 Proactive Maintenance

Another advantage of the cloud service 40, for the corporation and for the service providers, is active visibility of the Wi-Fi network 10. This can include proactive network monitoring and maintenance, using machine learning, such as described in U.S. patent application Ser. No. 17/071,015, filed Oct. 15, 2020, and entitled "Intelligent monitoring systems and methods for cloud-based Wi-Fi," the contents of which are incorporated by reference in their entirety. This machine learning based monitoring can learn various aspects, including, for example:

Highlights which employees have not set it up, and can automatically send request Can identify users or corporate infrastructure which is offline or not functioning correctly Can identify issues that affect the corporate network: parallel network, network instability.

§ 5.8 Multiple Corporate Virtual Networks

While the foregoing description was focused on a single corporate virtual network 500B, often multiple users can work from the same location for different companies, e.g., spouses, roommates, etc. The present disclose contemplates multiple corporate virtual networks 500B on the same Wi-Fi network 10. The same AP hardware is used for private and multiple corporate networks. The same NOC dashboard is used by both corporations, but based on their login credentials they only see their own information. The mobile app similarly has multiple logins, and the employee using the app sees only private network and the corporate network with which they are associated (e.g., cannot see anything about a spouse's corporate network).

§ 6.0 Networking Design of the Virtual Networks

The following describes an example embodiment of the networking configuration in the Wi-Fi hardware to support two virtual networks, namely the personal virtual network 500A and the corporate virtual network 500B, on the same physical network. The personal virtual network 500A and the corporate virtual network 500B, in this embodiment, are separated and devices on one network cannot communicate with devices on the other. In this embodiment, the personal virtual network 500A is configured on the Wi-Fi hardware in a router mode, and the corporate virtual network 500B is configured as a separate virtual local area network (VLAN). In other embodiments, multiple virtual networks can be configured each as a VLAN.

Figure 12:
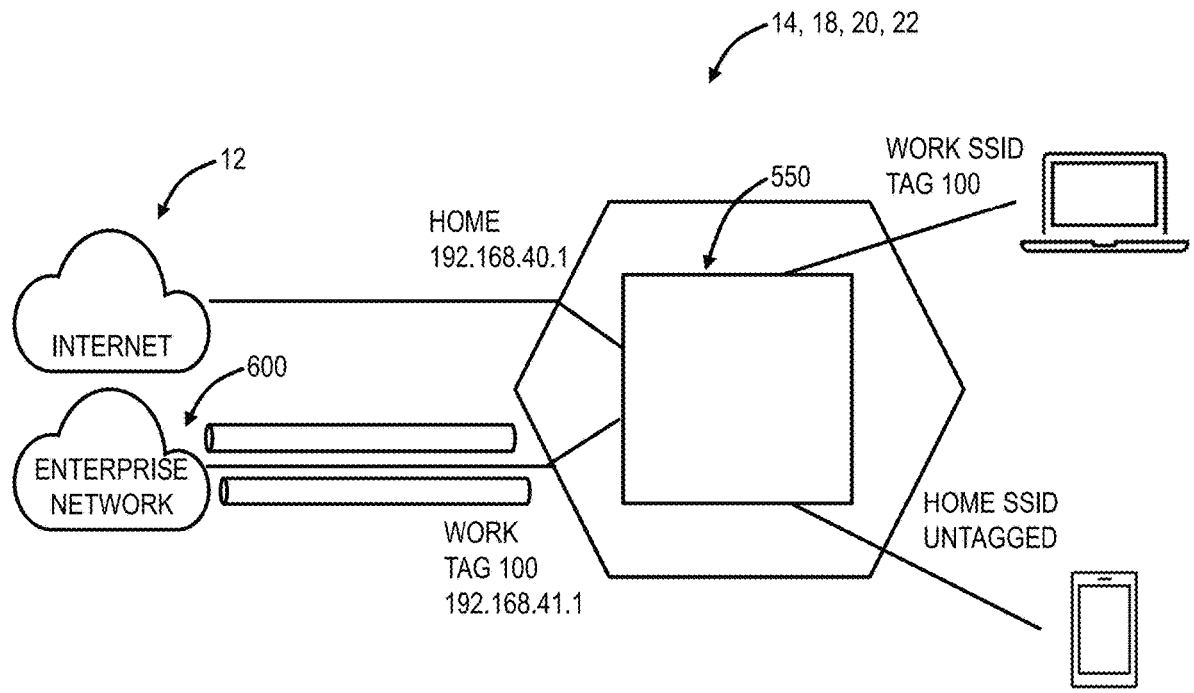
FIG. 12 is a network diagram of a Wi-Fi access point for implementing multiple virtual networks.
Figure 13:
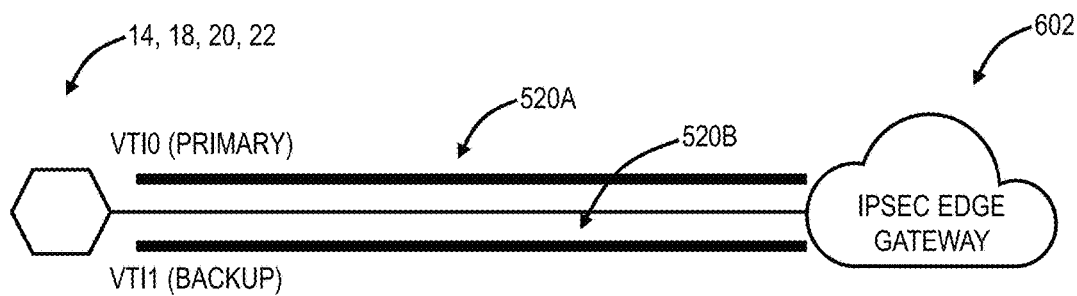
FIG. 13 is a network diagram of secure tunnels to an enterprise network.

FIG. 12 is a network diagram of a Wi-Fi access point 14, 18, 20, 22 for implementing multiple virtual networks. FIG. 13 is a network diagram of secure tunnels 520A, 520B to an enterprise network 600. The Wi-Fi hardware, i.e., access point including any of the devices 14, 18, 20, 22 described herein, includes an Open vSwitch 550 which can separate the virtual networks 500 via VLAN tags, or via some of the virtual networks 500 being untagged.

This approach includes a network combining 2 virtual networks (Work and Home) residing on the same physical network. Networks will be separated between each other and devices will not be able to communicate between each other. In an embodiment, the Home network is performed with the Wi-Fi access point in a router mode and a VLAN separated Work Network, e.g., with a VLAN example tag of 100. The Open vSwitch 550 includes a TAP interface tagged with VLAN 100. Those skilled in the art will recognize multiple virtual networks can be supported with different VLAN tags and configuration in the Open vSwitch 550.

§ 6.1 VPN Tunnel

The Wi-Fi access point 14, 18, 20, 22 can include virtual tunnels 520A, 520B to the enterprise network 600, such as to an edge gateway 602. The virtual tunnels 520A, 520B can include a Virtual Tunnel Interface (VTI), labeled as VTI0 and VTI1 for primary and backup. One or both of the virtual tunnels 520A, 520B can be up, but only one can be active. The Open vSwitch 550 is configured to route VPN traffic through the active tunnel. For example, routes for all up tunnels 520 can be installed, with different metrics, and the lowest metric can be active. There can be a tunnel health check periodically with a timeout of a tunnel 520 after an unsuccessful health check.

The tunnels 520 can support various types of IPSec, including
Encryption: 3DES, AES128, AES192, AES256, AES-CBC, AES-GCM
Authentication an integrity hash: MD5, SHA1, SHA256
DH groups: 1 (modp768), 2 (modp1024), 5 (modp1536), 14 (modp2048), 15 (modp3072), 16 (modp4096), 17 (modp6144), 18 (modp8192).

§ 7.0 Conclusion

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi network comprising:
one or more Wi-Fi access points each comprising circuitry configured to:
provide a plurality of virtual networks including a home network and a work network;
segment each of the plurality of virtual networks based on visibility, the segmentation comprising:
collecting measurements from firmware drivers from each of the plurality of virtual networks;
pre-processing the measurements into a standardized format;
serializing and packetizing the pre-processed measurements; and
communicating information based on the serializing and packetizing to a cloud service, such that operations for managing services via each of the plurality of virtual networks are configured based on the communicated information;
connect to a corporate network via one or more secure tunnels;
connect to one or more user devices; and
route traffic, over the corporate network, based on the communicated information, for the one or more user devices, the routing being further based on which particular virtual network the one or more user devices are connected on.

2. The Wi-Fi network of claim 1, wherein the one or more Wi-Fi access points are deployed and operational and include a middleware layer that is upgraded to support the plurality of virtual networks.

3. The Wi-Fi network of claim 1, wherein the one or more Wi-Fi access points include a plurality of access points in either a mesh network or tree network, and wherein each of the plurality of access points are configured to support the plurality of virtual networks.

4. The Wi-Fi network of claim 1, wherein the one or more Wi-Fi access points include a mobile hotspot.

5. The Wi-Fi network of claim 1, wherein the one or more Wi-Fi access points utilize OpenFlow and include an Open virtual switch which includes virtual local area network (VLAN) tags on any of the plurality of virtual networks.

6. The Wi-Fi network of claim 1, wherein the plurality of virtual networks are segmented in terms of control such that a user controls the home network and corporate information technology (IT) controls the work network.

7. The Wi-Fi network of claim 6, wherein the control includes network password, network name, guest passwords, security policies, content access limits, time of day use, internet freeze, prioritization of traffic within a network, and networking configuration including exposing ports.

8. The Wi-Fi network of claim 6, wherein the user is able to enable or disable the work network.

9. The Wi-Fi network of claim 1, wherein the plurality of virtual networks are segmented in terms of visibility via a mobile app that is used by the user for visibility of the plurality of virtual networks.

10. The Wi-Fi network of claim 9, wherein the user is able to set the visibility of the work network to corporate information technology (IT) via the mobile app.

11. The Wi-Fi network of claim 9, wherein corporate information technology (IT) is able to view the visibility via a network operations center dashboard that only shows details of the work network.

12. The Wi-Fi network of claim 11, wherein a service provider is further configured to see visibility via the network operations center dashboard.

13. The Wi-Fi network of claim 1, wherein traffic is routed for the one or more user devices based on which particular virtual network and associated prioritization.

14. The Wi-Fi network of claim 13, wherein the prioritization is application based including prioritization of a same application the same and different across all of the plurality of virtual networks.

15. The Wi-Fi network of claim 13, wherein the prioritization includes capacity reservations.

16. The Wi-Fi network of claim 1, wherein the plurality of virtual networks include a second work network that connects to a second corporate network via one or more second secure tunnels.

17. The Wi-Fi network of claim 1, wherein the one or more secure tunnels include a primary tunnel and a backup tunnel, and wherein the circuitry is configured to:
perform periodic health checks on the primary tunnel and the backup tunnel, and set an active tunnel based on the periodic health checks.

18. The Wi-Fi network of claim 1, wherein the circuitry is configured to:
connect to the cloud service for control and monitoring.

19. A method comprising:
providing a plurality of virtual networks including a home network and a work network;
segmenting each of the plurality of virtual networks based on visibility, the segmentation comprising:
collecting measurements from firmware drivers from each of the plurality of virtual networks;
pre-processing the measurements into a standardized format;
serializing and packetizing the pre-processed measurements; and
communicating information based on the serializing and packetizing to a cloud service, such that operations for managing services via each of the plurality of virtual networks are configured based on the communicated information;
connecting to a corporate network via one or more secure tunnels;
connecting to one or more user devices; and
routing traffic, over the corporate network, based on the communicated information, for the one or more user devices, the routing being further based on which particular virtual network the one or more user devices are connected on.

20. The method of claim 19, further comprising:
providing an application to a user of the Wi-Fi network for control and monitoring thereof; and
providing a network operations center dashboard to corporate information technology (IT) that only shows details of the work network.

* * * * *